July 9, 1968  L. BENOIT  3,391,482
FISHING TACKLE DROPAWAY SINKER
Filed Nov. 14, 1966
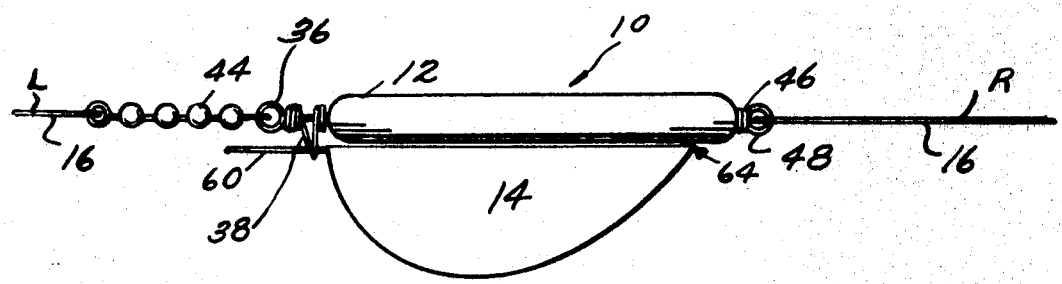
*Fig. 1.*
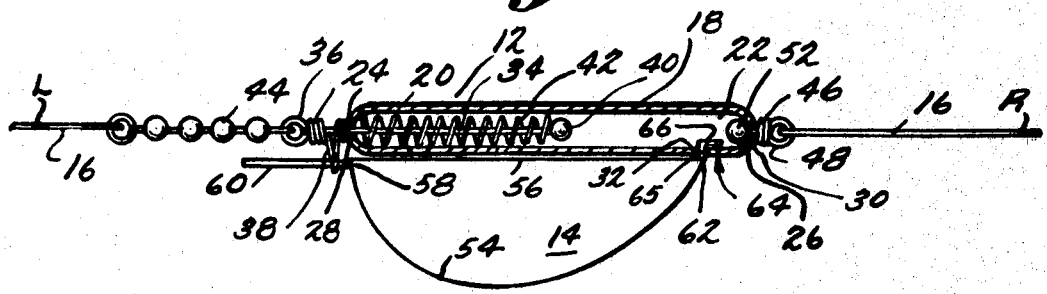
*Fig. 2.*
*Fig. 3.*
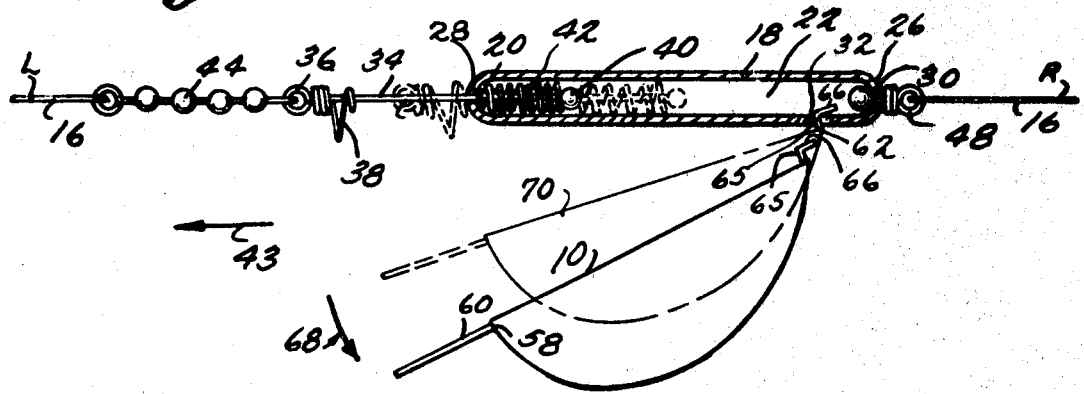
*Fig. 4.*
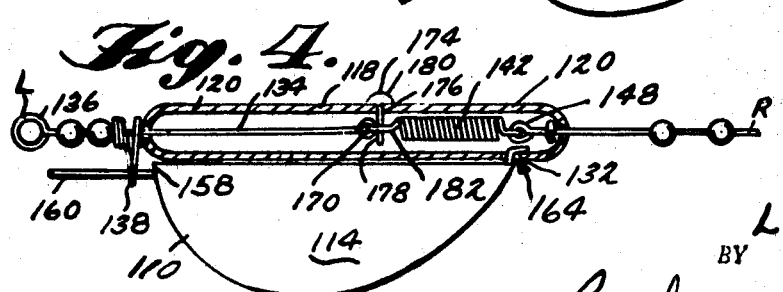
INVENTOR.
LOUIS BENOIT
BY
Cushman, Darby & Cushman
ATTORNEYS

United States Patent Office 3,391,482
Patented July 9, 1968

3,391,482
FISHING TACKLE DROPAWAY SINKER
Louis Benoit, 320 Miller Bldg., Yakima, Wash. 98901
Filed Nov. 14, 1966, Ser. No. 593,915
7 Claims. (Cl. 43—43.12)

My invention generally relates to a fishing apparatus which allows a portion thereof to drop away when a fish is hooked.

More specifically, my invention relates to a sinker for a fish line which has an attachment of such design that when a fish is hooked on the lower end of the line it effectuates a pull on the line automatically releasing the sinker body, thereby providing for the playing of the hooked fish free of the load of the sinker.

It is well known in fishing circles that a weight placed on the fishing line will aid the fisherman in trolling and in bottom fishing. However, it is also well known in these same circles that the weight which is necessarily required for trolling or bottom fishing also concomitantly aids the fisherman in landing his catch by tiring the hooked fish fighting against the hook and the weight. In order, therefore, to make the landing of the fish dependent upon the skill of the fisherman and not upon the mere tiring out of the fish, provisions have been made for having the sinker placed on the fishing line to drop away when a fish is hooked. In this manner, the fisherman enjoys a greater match for his fishing capabilities and even a smaller game fish will assure him of a fair battle. In the case of a lightly hooked fish, the chance of the hook tearing free is greatly minimized because of the fact that the fish does not have a heavy weight to bang against or contact, thus preventing tearing the hook loose. While the general concept of dropaway sinkers is well known in the prior art, such prior art dropaway sinker constructions have suffered both from structural and functional drawbacks.

A particular type of a dropaway sinker, which overcomes many of the disadvantages of the prior art, is disclosed and claimed in my prior Patent No. 3,177,606, issued on Apr. 13, 1965. While this sinker construction has generally functioned quite well, it has been found that under certain conditions of use, the dropaway construction at the reel end, the normally leading end during trolling operations, can have a tendency to snag weeds and other debris which are frequently encountered while trolling or bottom fishing.

Generally, my prior patent discloses a dropaway sinker having two rods operably connected to a cylindrical body within which is enclosed a spring mechanism. The two rods connected to the sinker body are operably maintained in position through two eye hooks. One of these hooks is slidably connected, being connected to the spring mechanism enclosed within the cylindrical body. The sliding action of this eye hook releases the sinker body from the cylindrical element and it drops away from the fishing line. The second rod, which is carried by the leading end of the sinker and projects therefrom, is susceptible to becoming entangled in foreign matter generally found at the bottom of most bodies of water during trolling operations and when the fishing line is retrieved.

The dropaway sinker construction of the instant invention comprises an improvement over the dropaway sinker construction disclosed and claimed in my aforementioned prior patent in that the present invention not only substantially eliminates the undesirable snagging during trolling, but also provides a simplified, less costly dropaway sinker construction. The present invention eliminates the need for a second eye hook and also eliminates the need for a holding pin when the fishing line is cast. The holding pin was necessary in my aforementioned prior construction to prevent the sinker from having a forward or rearward movement, and consequent unintentional freeing of the sinker from the fishing line when the line was cast. The particular dropaway sinker construction disclosed and claimed in the instant application effectively precludes premature, unintentional release of the sinker during casting without utilizing a separate holding pin.

It is a primary object of the present invention to provide for an improved dropaway sinker construction.

Another object of the present invention is to provide an improved dropaway sinker construction which not only tends to remain free from undesirable snagging and entanglement with weeds and the line during use, but it is also simple and economical to manufacture.

Other objects and purposes of the invention are stressed and brought forth in the accompanying description and drawings. The specific disclosures and embodiments of the invention are merely exemplary and should not be taken as limitative. In the drawings:

FIGURE 1 is a side elevational view showing a dropaway sinker embodying the present invention in assembled form attached to the fishing line and in position for use in fishing;

FIGURE 2 is a longitudinal sectional view of the dropaway sinker shown in FIGURE 1;

FIGURE 3 is a longitudinal sectional view similar to FIGURE 2 illustrating the dropping away operation of the present invention; and FIGURE 4 is a side elevational view showing a modified form of a dropaway sinker embodying the present invention.

Referring now to FIGURES 1 and 2 of the drawings, in which like numerals indicate and identify equivalent parts, there is shown a dropaway sinker assembly 10 comprising a strike or pull responsive release assembly 12 and a dropaway sinker member 14 operatively attached intermediate the lure or leader end L and the line or reel end R of a conventional fishing rig 16.

As best seen in FIGURE 2, the release assembly 12 includes a hollow tubular housing or shell 18 having an elongated cylindrical sidewall 20 defining a hollow axially extending bore 22 and terminating in opposed endwalls 24 and 26 adjacent the lure end L and reel end R, respectively, of the fishing line 16. Each endwall, 24 and 26, is provided with a small opening or aperture 28 and 30, respectively, which is substantially coaxial with, but of a smaller diameter than, the cylindrical bore 22. In addition, for purposes which will become more apparent as the description herein progresses, the sidewall 20 of the shell 18 is provided with a relatively small lateral aperture 32 near or adjacent to the endwall 26. An elongated substantially straight wire or rod-like connector element 34 is provided with an axially extending lure connecting loop or eye 36, and a fixedly depending, transversely extending sinker retaining loop or ring 38 at its free terminal end exteriorly of the shell 18. The rod-like connector element 34 extends slidably through the aperture 28 in the endwall 24 and into the bore 22 thereof where it terminates intermediate the endwalls 24 and 28 in a transversely enlarged head or flange 40. The connector element 34, which is thus capable of limited reciprocating movement axially of the shell 18, is normally but yieldably urged inwardly of the shell 18 toward the reel end endwall 26 thereof by means of a resiliently compressible, normally extended coil spring 42. The coil spring 42 is axially mounted around the connector element 34 within the bore 22 with its opposed ends interengaging the shell endwall 24 and the enlarged connector element head 40 so as to be compressible therebetween. Preferably, the lure connecting eye 36 is connected to the leader or lure end of the line by a suitable swivel arrangement 44, of a well known conventional construction. The reel end of the line 16 is connected to the release assembly 12 by means of a wire swivel 46 having an axially outwardly extending connector eye 48 and a shank portion 50 which extends rotatably through the aperture 30 in the endwall 26 and terminates within the bore 22 in an enlarged rounded anchoring head portion 52. The swivel connections 44 and 46 at the lure and reel ends respectively of line 16 are used to prevent entanglement and twisting of the fishing line 16 while in use.

The dropaway sinker member 14 has an elongated (arcuate) shaped lower edge 54 and a linear upper edge 56. The upper edge 56 is positioned adjacent to the sidewall 20 of the hollow tubular housing 18 of the release assembly 12. The lure end 58 of the dropaway sinker member 14 is provided with a straight linear rod 60, which projects outwardly from lure end 58 and is slidably and releasably retained and engaged by the depending transversely extending sinker retaining loop 38. The retaining loop 38 is secured against longitudinal movement relative to the rod-like connector element 34 so as to be movable therewith. The reel end 62 of the dropaway sinker member 14 is provided with a generally L-shaped hooking means or rod 64 which is received and releasably retained within the relatively small lateral aperture 32 in the sidewall 20 of the shell 18. As best seen in FIGURE 2 of the L-shaped hooking means 64 includes a generally vertically extending leg 65 which projects through the aperture 32 of shell 18 and a free terminal end portion 66 extending normal (with respect) to the leg 65 toward the reel end of the sinker 14 so as to engage the interior surface of the sidewall 20. Even though the hooking means 64 is shown to be inserted within the lateral aperture 32, which is located adjacent to or near the reel end of tubular housing 18, it is readily ascertainable, where different configurations are employed for the sinker member 14 that the lateral aperture 32 can be located at other appropriate points along the elongated sidewall 20 of the housing 18, as long as the hooking means 64 is insertable therein, and is releasable in the manner to be described hereinafter. By using this particular construction the problems encountered by the structure of my prior patent are alleviated and an improved operation is obtained.

Referring now specifically to FIGURE 3, operation of the dropaway sinker assembly 10 is illustrated. Prior to its dynamic operation the dropaway sinker element 14 is retained in the position shown in FIGURES 1 and 2. With the hooking means 64 disposed within the lateral aperture 32, and the linear rod 60, projecting from the sinker member 14, within the transverse retaining loop 38. The initial state of the rod-like element 34, the transversely enlarged head 40, and the transversely extending retaining loop 38 are shown by the dashed line in FIGURE 3.

As is well known, the lure or bait (not shown) is attached in a conventional manner to the lure end of line 16. When a fish is hooked at the end of line 16, a jerk or a pull is generated on line 16, in the direction indicated by arrow 43, which is transmitted through the swivel arrangement 44, to the rod-like connector element 34 by the axially extending lure connecting loop or eye 36. The pulling force being exerted on the connector element 34 compresses the coil spring 42, and moves the rod-like connector element 34 together with the depending retaining loop 38 axially toward the lure end L of the rig to its release position, shown in solid lines in FIGURE 3. When the retaining loop 38 has moved to its release position, beyond the free end of the outwardly projecting sinker rod 60, the rod 60 becomes disengaged therefrom and the lure end 58 of the sinker element 14 drops downwardly away from the release assembly 12 and begins its dropaway action. The movement of the sinker element 14 at this point is characterized by the arrow 68.

With the projecting rod element 60 disengaged from the sinker retaining loop 38, the sinker member 14 pivots about the hooking means 64 as depicted by the dashed line configuration 70 of the sinker element 14 until the free terminal end 66 of the hooking means 64 moves into alignment with the aperture 32 in the sidewall 20 and passes therethrough so as to become disengaged therefrom, as illustrated in solid lines in FIGURE 3. Thus, it will be seen that in response to a pull exerted on the lure end of the line 16, the sinker element 14 will rapidly become disengaged from the release assembly 12 so as to leave the fishing line 16 completely free of the sinker element 14.

Since the free end 66 of the hooking means 64 is disposed within the housing 18, it cannot become entangled in debris or weeds during trolling. Moreover, when operatively assembled, as shown in FIGURES 1 and 2, the engagement of the vertical leg portion 65 of the hooking means 64 with the edge of the aperture 32 will prevent premature disengagement of the sinker member 14, such as might occur during casting.

Referring to FIGURE 4, there is shown a modified dropaway sinker assembly 110 embodying the present invention. The dropaway sinker assembly 110 differs from the embodiment just described in that the connector rod 134 and the reel end swivel connector element 148 are connected to one another within the tubular housing 118 by means of a normally compressed, resiliently extendable coil spring 142. If desired, the release assembly 120 can be immobilized so that the sinker 114 will be retained on the line 116 by means of a locking pin 174 which is inserted within the hollow tubular housing 118 through a suitable aperture 176 formed in the sidewall 120 of the housing 118. The locking pin 174 comprises a shaft 178 and an enlarged flat head 180 and is forceably retained in its operative position within the aperture 176 by a force fit therewithin. The shaft 178 engages a laterally disposed connecting eye 182 which is located at the terminal end of the normally compressed coil spring 142 so as to prevent extension thereof and consequent release of the dropaway sinker member 114.

With the locking pin 174 so disposed, the release assembly 120 is immobilized and the sinker element 114 cannot drop away when a fish strikes. However, if it is desired to have the sinker element 114 drop away from the line automatically when a fish strikes, the dropaway assembly 110 is used without the locking pin 174. In this latter instance, the pulling force generated by the hooked fish will extend the normally compressed coil spring 142, allowing the sinker retaining loop 138 to move in conjunction with the rod-like connector element 134, thereby disengaging the outwardly projecting rod 160 of sinker element 114. This dynamic action allows the sinker element 114 to drop away in the same manner as described for the previous embodiment and as shown in FIGURE 3.

The objects of the invention and all its pertinent elements have been disclosed, and even though only particular embodiments are shown, it is understood that the invention can be modified without departing from the principles disclosed herein by a person of ordinary skill in the art. The particular embodiment shown herein should not be taken as limitative but only the claims appended hereto are intended to limit the invention.

What is claimed is:

1. A dropaway sinker assembly adapted to be attached intermediate the lure and reel ends of a fishing line comprising in combination:

an elongated housing having a sidewall defining a hollow axially extending bore terminating at one end of said housing in a reduced axial opening, the other end of said housing having a line connector means for connecting said other end to the reel end of a fishing line;

an elongated connector rod extending slidably within said bore through said axial opening and terminating in a free end portion exteriorly of said housing adapted to be connected to the lure end of a fishing line;

a laterally projecting retaining loop carried by said free end portion of said connector rod exteriorly of said housing, said retaining loop being fixed against longitudinal movement relative to said connector rod;

coil spring means extending axially within said hollow bore of said housing and engaging said connector so as to normally, but yieldably urge said connector rod axially interiorly of said housing;

a lateral opening in said housing sidewall intermediate the ends thereof; and a sinker having adjacent one edge at one end thereof a rod like extension projecting through and slidably engaging said retaining loop and adjacent the other end thereof a hook-like rod means, said hook-like rod means including a first portion extending from said sinker through said lateral opening in said housing sidewall and into said hollow bore and a second free end portion extending angularly with respect to said first portion within said hollow bore so as to engage the interior of said housing sidewall and thereby releasably retain said sinker assembly to said housing, whereby the application of a pulling force on said connector rod will allow said sinker to drop away from said housing.

2. The structure defined in claim 1 wherein the housing is cylindrical.

3. The structure defined in claim 1 wherein the housing includes a transversely extending end wall at its one end and the coil spring is normally extended and disposed intermediate said end wall and a transversely enlarged flange on the terminal end of the elongated connector rod, so as to be resiliently compressible therebetween in response to a predetermined pull exerted on said connector rod.

4. The structure defined in claim 1 wherein the other end of the housing includes a second reduced axial opening for receiving the line connector means, said connector means comprising a swivel arrangement.

5. The structure defined in claim 4 including the line connector swivel arrangement having a shank portion with a retaining inner end operatively adjacent to said other end wall of said housing, and an axially outwardly extending retaining connector eye, said shank portion being received by said second axial opening and said eye being connected to the reel end of a fishing line.

6. The structure as defined in claim 4 including the line connector swivel arrangement having a shank portion extending slidably within the bore of the housing through the second reduced axial opening and terminating in an eye connector within said housing connected to one end of the coil spring means, the elongated connector rod having an inner end portion within said housing bore terminating in an eye connector, connected to the other end of said coil spring means, and said coil spring being normally compressed so as to be resiliently expandable therebetween in response to a predetermined pull exerted on said connector rod.

7. The structure defined in claim 1 including a second lateral opening in the housing sidewall intermediate the ends thereof, and a locking pin removably disposed within said second lateral opening extending transversely into the hollow bore so as to prevent axial movement of the connector rod relative to said housing, so that when a pulling force is exerted on said connector rod the sinker means remains connected to said housing.

References Cited

UNITED STATES PATENTS

| | | | |
|---|---|---|---|
| 2,932,115 | 4/1960 | Dunn | 43—43.12 |
| 3,177,606 | 4/1965 | Benoit | 43—43.12 |

SAMUEL KOREN, *Primary Examiner.*

J. H. CZERWONKY, *Assistant Examiner.*